(12) United States Patent
Frank et al.

(10) Patent No.: US 7,049,717 B2
(45) Date of Patent: May 23, 2006

(54) MACHINE DEVICE HAVING SUPERCONDUCTING WINDING AND THERMOSIPHON COOLING OF WINDING

(75) Inventors: Michael Frank, Uttenreuth (DE); Adolf Kühn, Röthenbach (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 96 days.

(21) Appl. No.: 10/913,502

(22) Filed: Aug. 9, 2004

(65) Prior Publication Data

US 2005/0088048 A1   Apr. 28, 2005

(30) Foreign Application Priority Data

Aug. 7, 2003   (DE) ................. 103 36 277

(51) Int. Cl.
*H02K 9/06*   (2006.01)
(52) U.S. Cl. ............... 310/61; 310/64; 310/59
(58) Field of Classification Search .......... 310/52, 310/61, 58, 54, 64, 60 A; 505/166
See application file for complete search history.

(56) References Cited

U.S. PATENT DOCUMENTS

| | | | |
|---|---|---|---|
| 5,365,133 A * | 11/1994 | Raad | 310/68 D |
| 5,848,532 A | 12/1998 | Gamble et al. | |
| 6,590,305 B1 * | 7/2003 | Wang et al. | 310/54 |
| 6,707,180 B1 * | 3/2004 | Hattori et al. | 310/61 |
| 6,777,841 B1 * | 8/2004 | Steinmeyer | 310/90.5 |
| 2004/0056541 A1 | 3/2004 | Steinmeyer | |

FOREIGN PATENT DOCUMENTS

| | | |
|---|---|---|
| JP | 58-43172 | 3/1983 |
| WO | WO 00/13296 | 3/2000 |
| WO | WO 02/43224 A1 | 5/2002 |

OTHER PUBLICATIONS

Proceedings of the Sixteenth International Cryogenic Engineering Conference (ICEC 16), Kitakyushu, JP, May 20-24, 1996, Verlag Elsevier Science, 1997, pp. 1109-1129.

* cited by examiner

*Primary Examiner*—Darren Schuberg
*Assistant Examiner*—Leda T. Pham
(74) *Attorney, Agent, or Firm*—Staas & Halsey LLP

(57) ABSTRACT

A superconducting device has a rotor rotatable about an axis of rotation and a superconducting winding in a heat conducting winding carrier. The winding carrier has a central cooling agent cavity with a lateral cavity leading out of the winding carrier connected thereto. A cold head associated with a cooling unit is connected to a condenser unit which condenses the cooling agent. A fixed heat tube guiding the cooling agent is coupled to the condenser unit, protruding axially into the co-rotating lateral cavity and is sealed in relation thereto.

14 Claims, 4 Drawing Sheets

MACHINE DEVICE HAVING SUPERCONDUCTING WINDING AND THERMOSIPHON COOLING OF WINDING

CROSS REFERENCE TO RELATED APPLICATIONS

This application is based on and hereby claims priority to German Application No. 103 36 277.0 filed on 7 Aug. 2003, the contents of which are hereby incorporated by reference.

BACKGROUND OF THE INVENTION

1. Field of the Invention

The invention relates to a machine device having a rotor, which is mounted such that it can rotate about a rotation axis and has at least one superconducting winding, whose conductors are coupled in a thermally conductive manner to a central, cylindrical rotor cavity which extends in the axial direction and is part of a closed pipeline system, in which there is a refrigerant which circulates using a thermosiphon effect, condensed refrigerant passing into the central rotor cavity, and evaporating refrigerant emerging there from the rotor cavity. A corresponding machine device is described in WO 02/43224 A1.

2. Description of the Related Art

Since 1987, metal-oxide superconductor materials having critical temperatures $T_c$ of over 77 K have been known. These materials are therefore also referred to as high $T_c$ superconductor materials or HTS materials and in principle allow a cooling technique using liquid nitrogen ($LN_2$).

Using conductors formed of HTS materials, attempts are also being made to produce superconducting windings for machines. Conductors known to date, however, have a relatively low current-carrying capacity, in particular in magnetic fields having inductions in the Tesla range. It is therefore often necessary, despite the intrinsically high critical temperatures $T_c$ of the materials used, to keep the conductors of such windings at a temperature level, which is significantly below 77 K, of, for example, between 10 and 50 K in order to make it possible to carry significant currents at high field strengths. Such a temperature level is significantly higher than 4.2 K, the boiling point of liquid helium (LHe), at which known metallic superconductor materials having a comparably lower critical temperature $T_c$, so-called low $T_c$ superconductor materials or LTS materials, are cooled. One suitable refrigerant is therefore, for example, liquid neon (LNe).

For the purpose of cooling windings with HTS conductors in the mentioned temperature range below 77 K, refrigeration equipment in the form of so-called cryogenic coolers having a closed cycle of He compressed gas is preferably used. Such cryogenic coolers are, in particular, of the Gifford-McMahon or Stirling type or are in the form of so-called pulse tube coolers. They make it possible for the cooling power to be made available almost at the press of a button and do not require the use of cryogenic liquids. When using such refrigeration equipment, the superconducting winding is cooled indirectly only by transferring the heat to a cold head of a refrigerator (cf. for example Proc. 16th Int. Cryog. Engng. Conf. (ICEC 16), Kitakyushu, J P, 20–24, May 1996, Verlag Elsevier Science, 1997, pages 1109 to 1129).

A corresponding cooling technique is also provided for the rotor of an electrical machine as is described in the WO-A specification mentioned initially. The rotor contains a winding having HTS conductors which are located in a thermally conductive winding mount. This winding mount is equipped with a central, at least largely cylindrical, rotor cavity which extends in the axial direction and to the sides of which are connected tubular pipeline parts passing out of the winding mount. These pipeline parts run in a geodetically higher condenser space of a refrigeration unit and form, together with this condenser space and the central rotor cavity, a closed single-pipe pipeline system. Located in this pipeline system is a refrigerant which circulates on the basis of a so-called thermosiphon effect. In this case, refrigerant condensed in the condenser space is passed via the tubular pipeline parts to the central rotor cavity, where it absorbs and vaporizes heat owing to the thermal coupling to the winding mount and thus to the HTS winding. The vaporized refrigerant then passes back via the same pipeline parts to the condenser space where it is recondensed. The cooling power required for this purpose is produced by a refrigeration machine, whose cold head is thermally coupled to the condenser space. The return flow of refrigerant is in this case driven toward the parts of the refrigeration machine which act as the condenser owing to a slight excess pressure in the central rotor cavity acting as the vaporizer part. This excess pressure produced by gas being produced in the vaporizer part and the condensation in the condenser space thus results in the desired refrigerant return flow. Corresponding refrigerant flows are also known in principle from so-called "heat pipes".

In the case of the known machine using thermosiphon cooling by a corresponding refrigeration unit, the refrigerant is thus transported merely using the force of gravity, so that no further pumping systems are required. If it is desired to provide such a machine device, including a machine and an associated refrigeration unit, on ships or offshore installations, it is often necessary to take into account static skews, a so-called "trim", of an order of magnitude of up to ±5° and/or dynamic skews of up to ±7.5° in the longitudinal direction. In order to obtain approval for use in a ship, the refrigeration system of such a machine unit on board a marine vessel must thus ensure reliable cooling even under these conditions. If it is desired to permit skews of the machine, there is in this case the risk, however, that a region of the tubular pipeline parts between the central rotor cavity and the refrigeration unit will lie at a geodetically lower level than the central rotor cavity. The result of this is that the refrigerant cannot reach the rotor cavity to be cooled owing to the influence of the force of gravity. Cooling of the machine and thus its operation would thus no longer be ensured.

There are a number of known suggestions for counteracting this risk:

One simple solution is to arrange the machine such that it is inclined with respect to the horizontal, with the result that even in the case of a very large assumed trim or oscillation amplitude there is still a gradient in the direction of the rotor cavity in the thermosiphon pipeline system. A correspondingly inclined arrangement is undesirable in shipbuilding, in particular in the case of larger machine lengths, owing to the large amount of space that is required in this case.

Instead of a single-pipe pipeline system, in which the liquid and the gaseous refrigerants flow through identical pipe parts, two-pipe pipeline systems for refrigerant circulation using a thermosiphon effect are also known (cf. for example WO 00/13296 A1). In this case, however, an additional pipe must be provided for the gaseous refrigerant in the region of the hollow shaft of the rotor. This also requires additional sealing complexity.

In principle, the refrigerant may also be forced to circulate by a pumping system. For this purpose, however, correspondingly high complexity is required in terms of the apparatus, in particular if the refrigerant is intended to be, for example, at a low temperature of, for example, approximately 30 K. Such circulation systems also bring about considerable losses and can scarcely fulfill the service life requirements for shipbuilding with its long maintenance intervals.

In addition, there is the problem that, when the machine is inclined in the longitudinal direction such that the entry end of the refrigerant into the central rotor cavity is at a geodetically lower level than the axially opposite end, the refrigerant flows in the direction of the region of the refrigerant entry end in response to the force of gravity. It would thus no longer be possible to reliably ensure cooling of the machine and thus its standby operation, since, in this region, thermal losses which are too high and undesirable cooling of the rotor shaft result. In normal operation, i.e. in the normal operating state, this problem does not occur, since in this case, owing to the rotation and possibly the slightly conical design of the central rotor cavity, the refrigerant is forced toward the outer walls and is pushed in the direction of the axially opposite end to the entry end of the refrigerant.

SUMMARY OF THE INVENTION

An aspect of the present invention is to design a machine device having the features mentioned initially such that at least the accumulation of refrigerant, as mentioned, in the central rotor cavity on the refrigerant entry end is prevented in the standby state of the machine.

This aspect is accomplished by rotating the rotor in the non-operating state, where the central rotor cavity for the refrigerant has at least one helical or spiral feed path running from the entry end of the refrigerant into the rotor cavity axially toward the opposite end. The term non-operating state is understood in this case to mean any state of the machine in which a desired rotational speed of the rotor is not provided and, in particular, a standby operating mode/disconnected mode is provided.

The advantages associated with this refinement of the machine device are, in particular, that, even in the case of its machine having a skew in the unfavorable direction depicted, the refrigerant still remains in the entire central interior of the rotor. This is because, when the machine is in the non-operating state (or standby mode), the rotor rotates slowly (so-called "turn") with the aid of a rotation mechanism. Owing to the helical or spiral design of the refrigerant feed path, in this case the refrigerant is fed from the refrigerant entry end to the opposite end and is thus kept in the entire interior of the rotor cavity. This also makes it possible to control the standby losses, thus making standby operation possible. One precondition for classifying the machine as a main generator is thus fulfilled.

Further, the device may have a hollow-cylindrical, central rotor cavity having a single- or multi-start feed screw, in particular in the form of an Archimedes screw. Such a screw can easily be installed in the rotor cavity.

Instead, the hollow-cylindrical, central rotor cavity may also have a groove-like feed path on its radially outer inner wall. When the rotor is rotating slowly in the non-operating state, in this case the refrigerant flows in the groove toward the axially opposite side.

In addition, the pressure may be increased to bring about a short-term pumping action on the liquid refrigerant in the direction of the central rotor cavity by pressure pulses of gaseous refrigerant. Owing to the thermal inertia of the system, it is sufficient if the rotor cavity is subsequently filled with refrigerant at time intervals for a sufficiently short period of time, in particular in a pulsed manner. Even when the rotor has a skew, the superconducting winding is thus reliably cooled in the operating state owing to the central rotor cavity being sufficiently filled.

The pressure-increasing mechanism may preferably act on the region of a condenser space or tubular pipeline parts running from the condenser space to the central rotor cavity. It is necessary to reliably feed the liquid refrigerant in the central rotor cavity even in the case of realistic skews.

One preferred measure for short-term pumping during a corresponding period of time involves a buffer volume which is filled with gaseous refrigerant at an increased pressure and must be connected to the condenser space or to the pipeline parts connected to the condenser space via a pump which feeds the gaseous refrigerant.

Instead, a heating apparatus acting on the liquid refrigerant may be applied to the tubular pipeline parts and can be activated for short-term pumping during a corresponding period of time. In this case, the heating apparatus may advantageously be arranged in a buffer volume which is filled at least partially with liquid refrigerant. Corresponding ways to increase pressure can be provided comparatively simply.

For the purpose of feeding the liquid refrigerant to the central rotor cavity, a permanently pulsating pressure increase may advantageously be provided. Corresponding feeding requires only a small amount of hardware complexity. Instead or in addition, a pressure increase initiated by sensors may be provided. For this purpose, a position sensor which triggers the pressure increase and detects the inclination of the rotation axis with respect to the horizontal or a filling level sensor which triggers the pressure increase may be used on the tubular pipeline parts.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
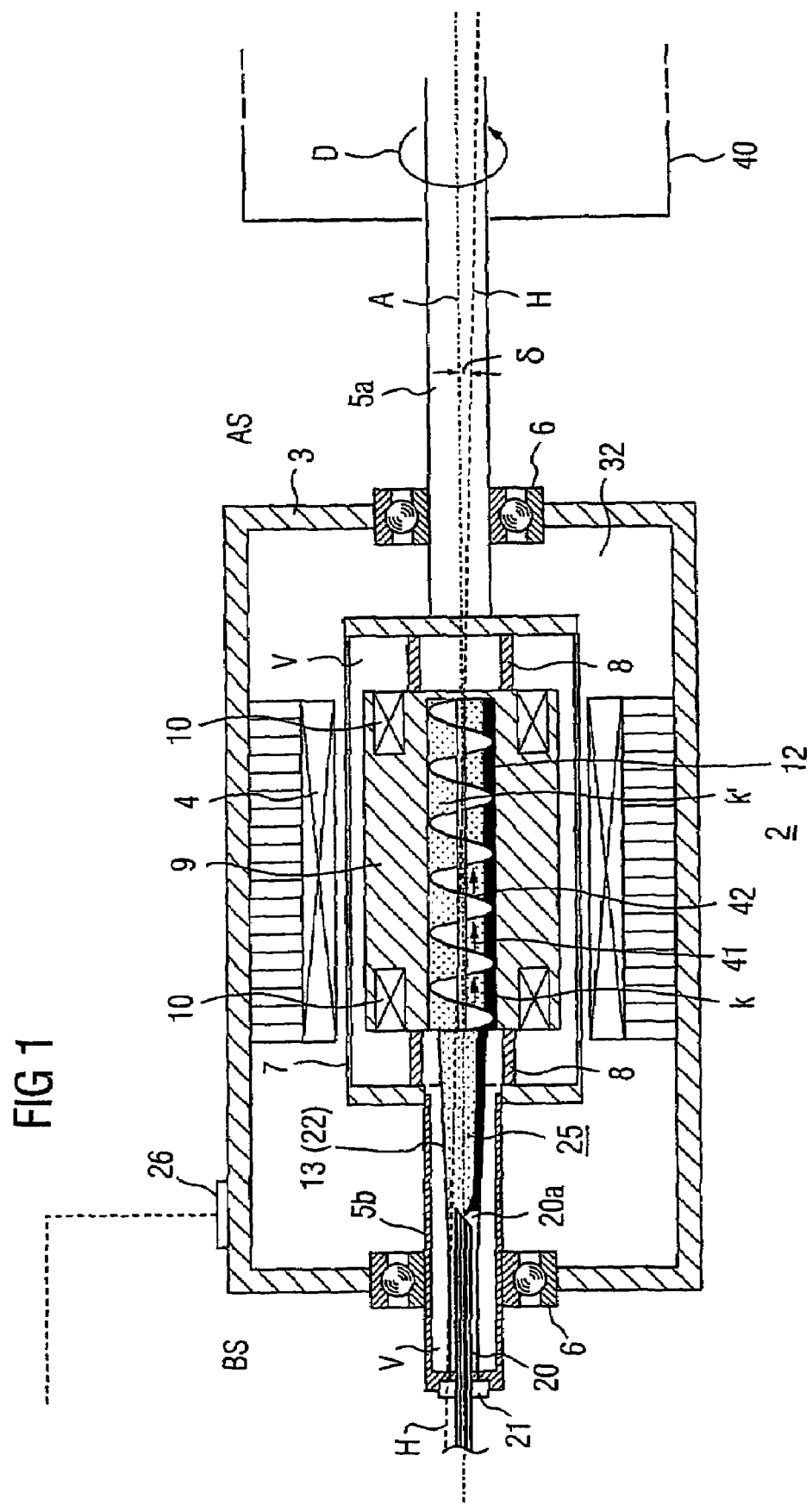
FIG. 1 is a longitudinal cross section of an embodiment of a machine according to the present invention.

Reference will now be made in detail to the preferred embodiments of the present invention, examples of which are illustrated in the accompanying drawings, wherein like reference numerals refer to like elements throughout.

Machine devices according to the invention each include a machine or a motor and an associated refrigeration unit.

The embodiment of this machine described below with reference to the figures may be, in particular, a synchronous motor or a generator. The machine has a rotating, superconducting winding which in principle allows for metallic LTS material (low $T_c$ superconductor material) or oxide HTS material (high $T_c$ superconductor material) to be used. The latter material is used as the basis for the following exemplary embodiments. The winding may include a coil or a system of coils in a two-, four or other multiple arrangement. The basic design of a corresponding synchronous motor is shown in FIG. 1, in which the embodiment of such a machine which is known from WO 02/43224 mentioned initially is used as the basis.

The machine given the reference 2 has a fixed, outer housing 3, at room temperature, having a stator winding 4. Within the outer housing and surrounded by the stator winding 4, a rotor 5 is mounted in bearings 6 such that it can rotate about a rotation axis A. It is mounted at the drive end AS on a solid rotor shaft part 5a, which is rigidly connected, for example, to a turbine as drive means. At the opposite end, the rotor merges with a tubular shaft part 5b, by which, inter alia, cryogen is supplied and electrical connections are made. This end of the rotor is therefore also referred to as the non-drive end BS. The bearings 6 may be conventional mechanical bearings or else magnetic bearings. The rotor also has a vacuum vessel 7, in which a winding mount 9 having an HTS winding 10 is held on, for example, hollow-cylindrical, torque-transferring suspension elements 8. In this winding mount, a central rotor cavity 12 extending in the axial direction is provided concentrically about the rotation axis A and has, for example, a cylindrical form or is slightly conical when seen in cross section. The winding mount is in this case designed to be vacuum-tight with respect to this rotor cavity. It closes off the rotor cavity at the drive end AS of the rotor, which is mounted at this end by the solid axial rotor shaft part 5a. As the opposite end BS, the central rotor cavity 12 is connected to a lateral cavity 13 having a comparatively smaller diameter. This lateral cavity runs from the region of the winding mount outward from the region of the outer housing 3. This lateral cavity 13 is surrounded by the tubular rotor shaft part 5b mounted in one of the bearings 6.

Figure 2:
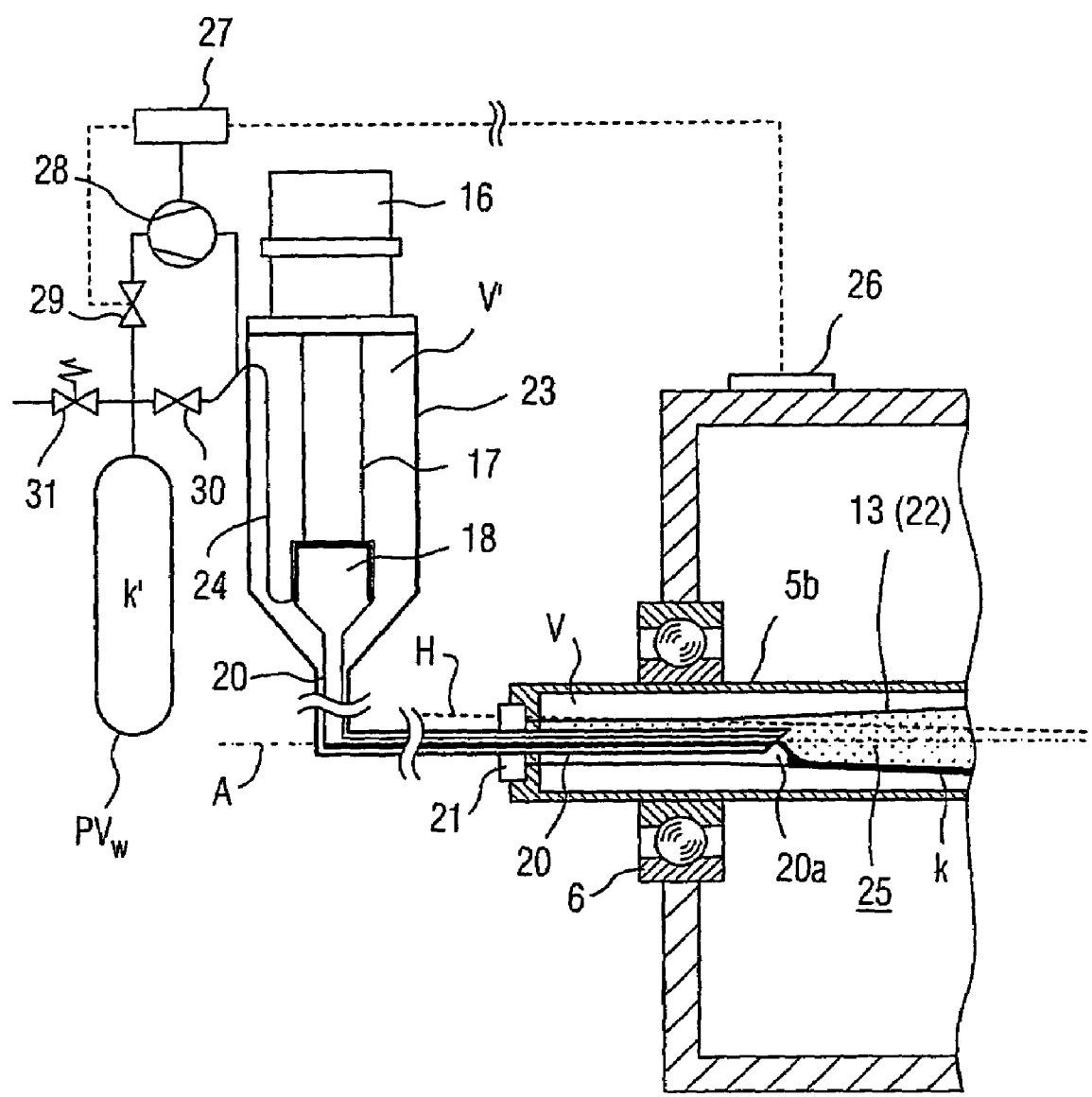
FIG. 2 is a block diagram of a refrigeration unit associated with this machine (partially shown in longitudinal cross section).

For the purpose of cooling the HTS winding 10 indirectly via thermally conductive parts, a refrigeration unit is provided which is illustrated in FIG. 2. Of this refrigeration unit, only a cold head 16 is illustrated. This refrigeration unit may be a cryogenic cooler of the Gifford-McMahon type or, in particular, a regenerative cryogenic cooler such as a pulse tube cooler or a split Stirling cooler. In this case, the cold head 16 and thus all of the essential, other parts of the refrigeration unit are located outside the rotor 5 or its outer housing 3.

The cold part of the cold head 16 which is arranged, for example, several meters to the side of the rotor 5 is, in a vacuum vessel 23, in good thermal contact, via a heat-transfer body 17, with a refrigerant condensation unit which has a condenser space 18. Connected to this condenser space is a vacuum-insulated, stationary heat pipe 20 which protrudes to the side in an axial region into the lateral, co-rotating cavity 13 or the central rotor cavity 12, as shown in the illustration in FIG. 1. Used for the purpose of sealing off the heat pipe 20 with respect to the lateral cavity 13 is a sealing device 21, which is not illustrated in any further detail in FIG. 1, having at least one sealing element which may be in the form of a ferrofluid seal and/or a labyrinth seal and/or a gap seal. Via the heat pipe 20 and the lateral cavity 13, the central rotor cavity 12 is connected to the heat exchange region of the condenser space 18 such that it is sealed off in a gas-tight manner from the outside. The tubular parts running between the central rotor cavity 12 and the condenser space 18, which serve the purpose of holding a refrigerant, are generally referred to as pipeline parts 22. These pipeline parts are, together with the condenser space 18 and the central rotor cavity 12, considered to be a pipeline system given the reference number 25 overall in FIG. 1.

These spaces in this pipeline system 25 are filled with a refrigerant which is selected depending on the desired operating temperature of the HTS winding 10. Possible refrigerants are, for example, hydrogen (condensation temperature 20.4 K at normal pressure), neon (condensation temperature 27.1 K at normal pressure), nitrogen (condensation temperature 77.4 K at normal pressure) or argon (condensation temperature 87.3 K at normal pressure). Mixtures of these gases may also be provided. The circulation of the refrigerant takes place in this case using a so-called thermosiphon effect. For this purpose, the refrigerant is condensed on a cold surface of the cold head 16 in the region of the condenser space 18. Then, the refrigerant which has been condensed in this manner and is given the reference k flows through the pipeline parts 22 into the central rotor cavity 12. The condensate is in this case transported using the force of gravity. For this purpose, the heat pipe 20 may advantageously be slightly (by a few degrees) inclined with respect to the rotation axis A in order to assist the liquid refrigerant k as it flows out of the open end 20a of the pipe 20. The liquid refrigerant is then vaporized in the interior of the rotor. The vaporized refrigerant is given the reference k'. This refrigerant, which has been vaporized with heat being absorbed, then flows through the interior of the pipeline parts 22 back into the condenser space 18. In this case, the return flow is brought about by a slightly increased pressure in the rotor cavity 12 acting as the vaporizer in the direction of the condenser space 18, which is caused by gas being produced in the vaporizer and the condensation in the condenser space. Since the circulation of the condensed refrigerant takes place from the condenser space 18 into the central rotor cavity 12, and the return flow of the vaporized refrigerant k' takes place from this rotor cavity back to the condenser space in the tubular pipeline system formed from the condenser space 18, the pipeline parts 22 and the rotor cavity 12, this may be referred to as a single-pipe pipeline system with circulation of the refrigerant k, k' on the basis of a thermosiphon effect.

As may also be seen in FIG. 1, when the machine 2 is used on ships or offshore installations, a skew may occur, in which the rotation axis A is inclined by an angle δ of a few degrees with respect to the horizontal H. Although, as before, the refrigerant is then condensed in the condenser space 18, the refrigerant can no longer reach the central rotor cavity 12, with the result that the pipeline parts 22 are gradually filled with liquid refrigerant k in particular in the region near the axis. If the pipeline system has a relatively low refrigerant filling level, the rotor interior or the rotor cavity 12 may then run dry and is thus no longer cooled. If the pipeline system has a higher filling level, the return flow of the gaseous refrigerant k' in the pipeline parts 22 toward the condenser space 18 is blocked after a certain amount of time by accumulated liquid refrigerant. Reliable cooling of the rotor or its superconducting winding is in this case likewise no longer ensured. This risk is particularly high when the rotor is not in its operating state, at a comparatively high rotation speed of, for example, 3600 revolutions per minute.

Figure 5:
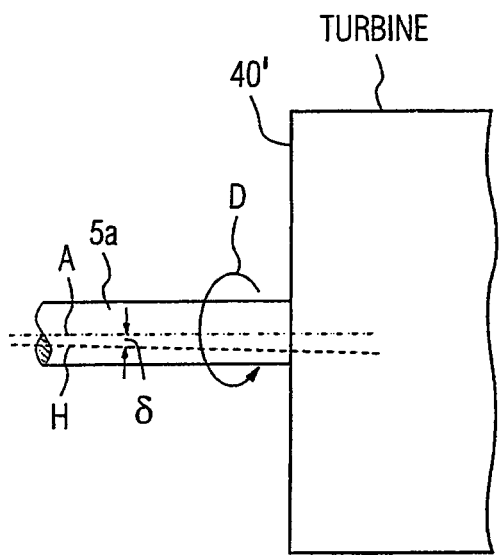
FIG. 5 is a block diagram of a possible rotation mechanism in accordance with another possible embodiment of the present invention.
Figure 6:
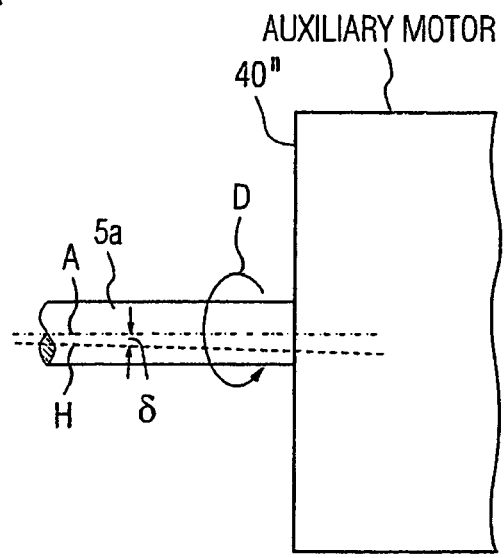
FIG. 6 is a block diagram of a further possible rotation mechanism in accordance with a further possible embodiment of the present invention.

For such a non-operating state, which in particular characterizes a standby state, two measures should therefore be provided according to the invention:

Firstly, rotating means 40 should be provided for slowly rotating the rotor in this non-operating state using, for example, a turbine 40' engaging with the shaft part 5a at the drive end AS, as shown in FIG. 5. In another potential embodiment, as shown in FIG. 6, a small electric auxiliary motor 40" may also be provided, which is used to rotate the rotor slowly. The rotational speeds are in this case generally between 10 and 100 revolutions per minute. The rotation in this case does not necessarily need to be permanent and/or also does not need to take place at a constant rotational speed.

Figure 4:
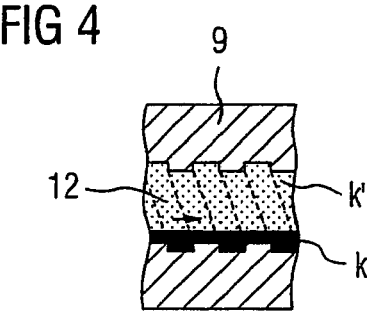
FIG. 4 is a longitudinal cross section of the central rotor cavity in accordance with another embodiment of the present invention.

Secondly, the rotor cavity 12 has at least one helical or spiral feed path 41 for the liquid refrigerant k, which runs from the non-drive end BS of the refrigerant k axially toward the opposite region on the drive end AS. A corresponding feed screw 42 may be provided in order to form the feed path 41. This feed screw 42 may have, in particular, the form of a so-called Archimedes screw. Corresponding pump apparatuses are also referred to as screw pumps. In addition, at least one corresponding helical groove may also be formed on the radially outer side of the central rotor cavity 12 as shown in FIG. 4. In this case, the rotation sense of the feed path 41 is designed such that, in the rotation direction D prescribed by the rotating means 40, the refrigerant k is fed from the non-drive end BS in the direction of the drive end AS.

The liquid refrigerant k in this state of the machine device and possibly also in the operating state may advantageously still be fed by the gas pressure on the condenser side being increased for a short period of time to such an extent that the refrigerant liquid is pushed out of the pipeline parts 22 against the force of gravity (if there is an angle of inclination δ) into the central rotor cavity 12.

Such a pressure increase may be produced according to the embodiment shown in FIG. 2 with the aid of a warm buffer volume $PV_w$ and a pump 28. With the aid of such pressure-increasing means, the gas pressure in the condenser space 18 can be increased temporarily, such that the liquid refrigerant k located there and in the pipeline parts 22 is pushed into the central rotor cavity 12. In a connecting line 24 between the buffer volume $PV_w$, which is at an excess pressure, and the condenser space 18 is therefore arranged a control valve 29 which opens the connection for the pump 28, which then feeds the gas k' from the buffer volume into the condenser space. A valve 30 allows for a return flow of excess gas from the pipeline system 20.

Pressure oscillation brought about in this way may take place permanently, i.e. at short, repeated time intervals (in each case for a short period of time), or can be controlled using a position sensor 26, which is illustrated in FIG. 1 and has a known design, and a control unit 27. This position sensor detects the skew with the angle of inclination δ of the machine 2 and thus triggers, via the control unit 27, the explained introduction of a pressure volume (gas pulse).

FIG. 2 does not illustrate further parts used for providing and removing the gas, such as through a filling valve, from where the system can be filled with gaseous refrigerant via the connecting line 24, since these parts are generally known. Only an overpressure valve 31 which responds to an impermissible overpressure in the system is illustrated.

Naturally, the parts or containers surrounding the refrigerant k or k' must be protected against the ingress of heat. For their thermal insulation, they are therefore expediently surrounded by a vacuum, it being possible, if necessary, also to provide insulating means such as superinsulation or insulating foam in the corresponding vacuum spaces. In FIG. 1, the vacuum enclosed by the vacuum vessel 7 is given the reference V. It also surrounds the pipe surrounding the side cavity 13 and extending up to the seal 21. The vacuum surrounding the heat pipe 20 as well as the condenser space 18 and the heat-transfer body 17 is given the reference V'. If necessary, a reduced pressure may also be produced in the interior 32 which surrounds the rotor 5 and is surrounded by the outer housing 3.

Figure 3:
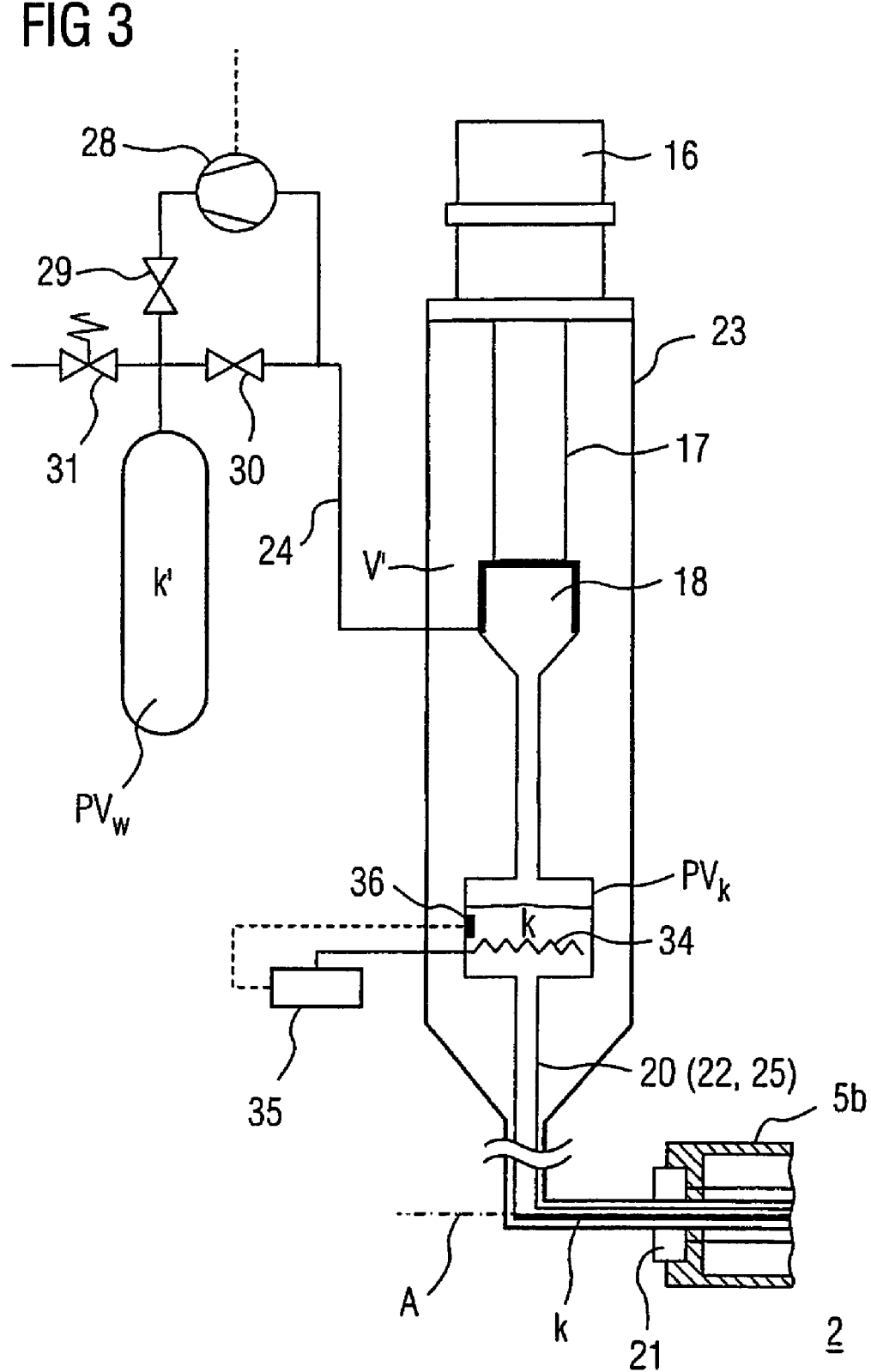
FIG. 3 is a block diagram of a further possible refinement of the refrigeration unit for the machine.

FIG. 3 shows a detail of a further refrigeration unit having a pressure-increasing means for the machine 2 shown in FIG. 1. In FIG. 3, only the parts of the refrigeration unit which are located outside the machine are illustrated. As one possible way of increasing the pressure, in this embodiment, a heating apparatus 34 is provided in the lower part of the vacuum vessel 23, in a region, which is always filled with liquid refrigerant k, of the connected pipeline parts 22 or the heat pipe 20. This heating apparatus, which is located in a cold buffer volume $PV_k$ which is thus generally at least partially filled with liquid refrigerant k, is always activated for a short period of time when the liquid level in the corresponding container or the pipeline parts 22 has fallen below a specific level. In this case, the valve 30 leading to the warm buffer volume $PV_w$ is closed. By this activation of the heating apparatus, a small amount of the liquid refrigerant k is in this case suddenly vaporized. The heating apparatus 34 is driven for this purpose by a control unit 35 which may be connected to a filling level sensor 36 in the cold buffer volume $PV_k$. The increase in pressure triggered by the heating pulse then pushes the remaining refrigerant k into the central rotor cavity 12 of the rotor 5.

If, in a special embodiment shown in FIG. 3, detection of the filling level in the region of the cold buffer volume $PV_k$ or of a corresponding region of the pipeline parts 22 by a sensor 36 can be dispensed with, it is also possible to produce the heating pulse periodically in order to repeatedly bring about the desired pressure increase in each case for a short period of time and at regular time intervals.

Naturally, it is also possible to combine this embodiment, explained with reference to FIG. 3, of a pressure-increasing mechanism with the embodiment illustrated in FIG. 2, which includes pump 28.

The invention has been described in detail with particular reference to preferred embodiments thereof and examples, but it will be understood that variations and modifications can be effected within the spirit and scope of the invention.

What is claimed is:

1. A machine device including a closed pipeline system, comprising:

a rotor, mounted to rotate about a rotation axis, with at least one superconducting winding formed of conductors coupled in a thermally conductive manner to a rotor cavity, having a substantially cylindrical shape, located centrally within said rotor and extending in an axial direction to the closed pipeline system to receive a refrigerant circulating by a thermosiphon effect, where liquid refrigerant passes into the rotor cavity at an entry end, and gaseous refrigerant emerges from the rotor cavity, the rotor cavity having at least one of a helical and a spiral feed path running from the entry end of the refrigerant into the rotor cavity axially toward an opposite end; and rotating means for rotating said rotor in a non-operating state to feed the liquid refrigerant from an entry end to an opposed end of the rotor cavity in the non-operative state.

2. The device as claimed in claim 1, wherein the central rotor cavity comprises a hollow cylinder formed with an Archimedes feed screw installed therein.

3. The device as claimed in claim 2, wherein the central rotor cavity has an inner wall with a groove-like design.

4. The device as claimed in claim 3, wherein said rotating means comprises a turbine.

5. The device as claimed in claim 3, wherein said rotating means comprises an auxiliary motor.

6. The device as claimed in claim 1, further comprising pressure-increasing means being used for increasing pressure temporarily for a short period of time on the liquid refrigerant towards the rotor cavity by pressure pulses of the gaseous refrigerant.

7. The device as claimed in claim 6, wherein said pressure-increasing means acts on a region of one of a condenser space and tubular pipeline parts of the closed pipeline system.

8. The device as claimed in claim 7, wherein said pressure-increasing means comprises a pump which feeds the gaseous refrigerant for short-term pumping during a corresponding period of time to fill a buffer volume, connected to the one of the condenser space and the pipeline parts connected to said condenser space, with the gaseous refrigerant at an increased pressure.

9. The device as claimed in claim 7, further comprising a heating apparatus, fitted to the tubular pipeline parts, acting on the liquid refrigerant and activated for short-term pumping during a corresponding period of time.

10. The device as claimed in claim 9, wherein the heating apparatus is disposed in a buffer volume at least partially filled with the liquid refrigerant.

11. The device as claimed in claim 6, wherein said pressure-increasing means produces a permanently pulsating pressure increase.

12. The device as claimed in claim 11, further comprising sensors initiating the permanently pulsating pressure increase.

13. The device as claimed in claim 12, wherein said sensors include at least one position sensor triggering the permanently pulsating pressure increase when an inclination of the rotation axis with respect to horizontal is detected.

14. The device as claimed in claim 13, wherein said sensors include a filling level sensor on the tubular pipeline parts triggering the permanently pulsating pressure increase.

* * * * *